United States Patent [19]

Press

[11] Patent Number: 5,748,739
[45] Date of Patent: May 5, 1998

[54] ACCESS CONTROL FOR SENSITIVE FUNCTIONS

[75] Inventor: James Press, Biggleswade, England

[73] Assignee: International Computers Limited, London, England

[21] Appl. No.: 543,641

[22] Filed: Oct. 16, 1995

[30] Foreign Application Priority Data

Nov. 5, 1994 [GB] United Kingdom .................. 9422389

[51] Int. Cl.$^6$ ...................................................... H04L 9/00
[52] U.S. Cl. ................................................ 380/25; 380/28
[58] Field of Search ................................ 380/23, 21, 25, 380/28; 235/492

[56] References Cited

U.S. PATENT DOCUMENTS

| | | | |
|---|---|---|---|
| 4,996,711 | 2/1991 | Chaum | 380/25 |
| 5,148,479 | 9/1992 | Bird et al. | 380/25 |
| 5,159,634 | 10/1992 | Reeds, III | 380/28 |
| 5,311,596 | 5/1994 | Scott et al. | 380/23 |
| 5,351,293 | 9/1994 | Michener et al. | 380/21 |
| 5,420,908 | 5/1995 | Hodges et al. | 380/23 |
| 5,455,862 | 10/1995 | Hoskinson | 380/21 |
| 5,495,098 | 2/1996 | Pailles et al. | 235/380 |

FOREIGN PATENT DOCUMENTS 0 592 808   4/1994   European Pat. Off. .

OTHER PUBLICATIONS

Ferreira, "The Practical Application Of State Of The Art Security In Real Environments". International Conference On Cryptology. Jan. 8–11, 1990. pp. 334–355.

*Primary Examiner*—Salvatore Cangialosi
*Attorney, Agent, or Firm*—Lee, Mann, Smith, McWilliams, Sweeney & Ohlson

[57] ABSTRACT

A data processing system has a security infrastructure, including a first cryptographic support facility, a security service for user data, including a further cryptographic support facility, and a number of cryptographic algorithms, usable by said cryptographic support facilities. In order to protect against a user replacing weak algorithms intended for the protection of data with strong algorithms intended for use by the security infrastructure, a challenge/response mechanism is provided, which enables the cryptographic support facilities to verify authenticity of the algorithms. The challenge/response mechanism is as follows. First, the cryptographic support facility sends a challenge to the algorithm. The algorithm then generates a response by applying a cryptographic function to the challenge, and returns the response to the cryptographic support facility. The cryptographic support facility then checks whether the response has an expected value. Only upon successful authentication does the algorithm reveal a pointer to a function table. The pointer is encrypted under a shared secret key to prevent an "attacker in the middle" attack.

5 Claims, 3 Drawing Sheets

ACCESS CONTROL FOR SENSITIVE FUNCTIONS

BACKGROUND OF THE INVENTION

This invention relates to access control to sensitive functions in a computer system.

Different national security bodies have differing data protection/security requirements. Some national bodies permit strong protection for the security infrastructure in a distributed computer system but insist on weaker protection for user data. Further, the different countries will tend to require different levels of strong and weak protection for the security infrastructure and user data respectively.

In a security system where different levels of strong and weak protection are provided by cryptographic facilities for the security infrastructure and for user data protection, it is possible to increase the flexibility of the access control system by simply replacing the weak algorithms which fit the requirements for protection of user data in one country with relatively weaker or stronger algorithms as appropriate to meet the requirements for protecting the integrity and confidentiality of user data in another country. The strengths of the cryptographic algorithms available to the security infrastructure could be altered in the same way.

However, before accepting such a system the national bodies would have to be convinced that the stronger algorithms available to the security infrastructure could not be used by the facilities available for the protection of user data.

The object of the present invention is to provide a means for ensuring the stronger algorithms available to the security infrastructure are not used by the facilities available for the protection of user data.

A second object of the present invention is to ensure that weaker algorithms accepted as providing the correct degree of protection to satisfy the requirements of a national body in one country are not replaced by stronger algorithms used to protect user data in another country. Similarly, to protect against substitution of weaker algorithms required to protect the security infrastructure in one country with stronger algorithms available to protect the security infrastructure in other countries.

SUMMARY OF THE INVENTION

According to the invention, a data processing system comprises:

(a) a security infrastructure. including a first cryptographic support facility;

(b) a security service for user data, including a further cryptographic support facility;

(c) a plurality of cryptographic algorithms, usable by said cryptographic support facilities; and (d) challenge/response means for enabling said cryptographic support facilities to verify authenticity of said algorithms.

DESCRIPTION OF AN EMBODIMENT OF THE INVENTION

One embodiment of the invention will now be described by way of example with reference to the accompanying drawings.

Figure 1:
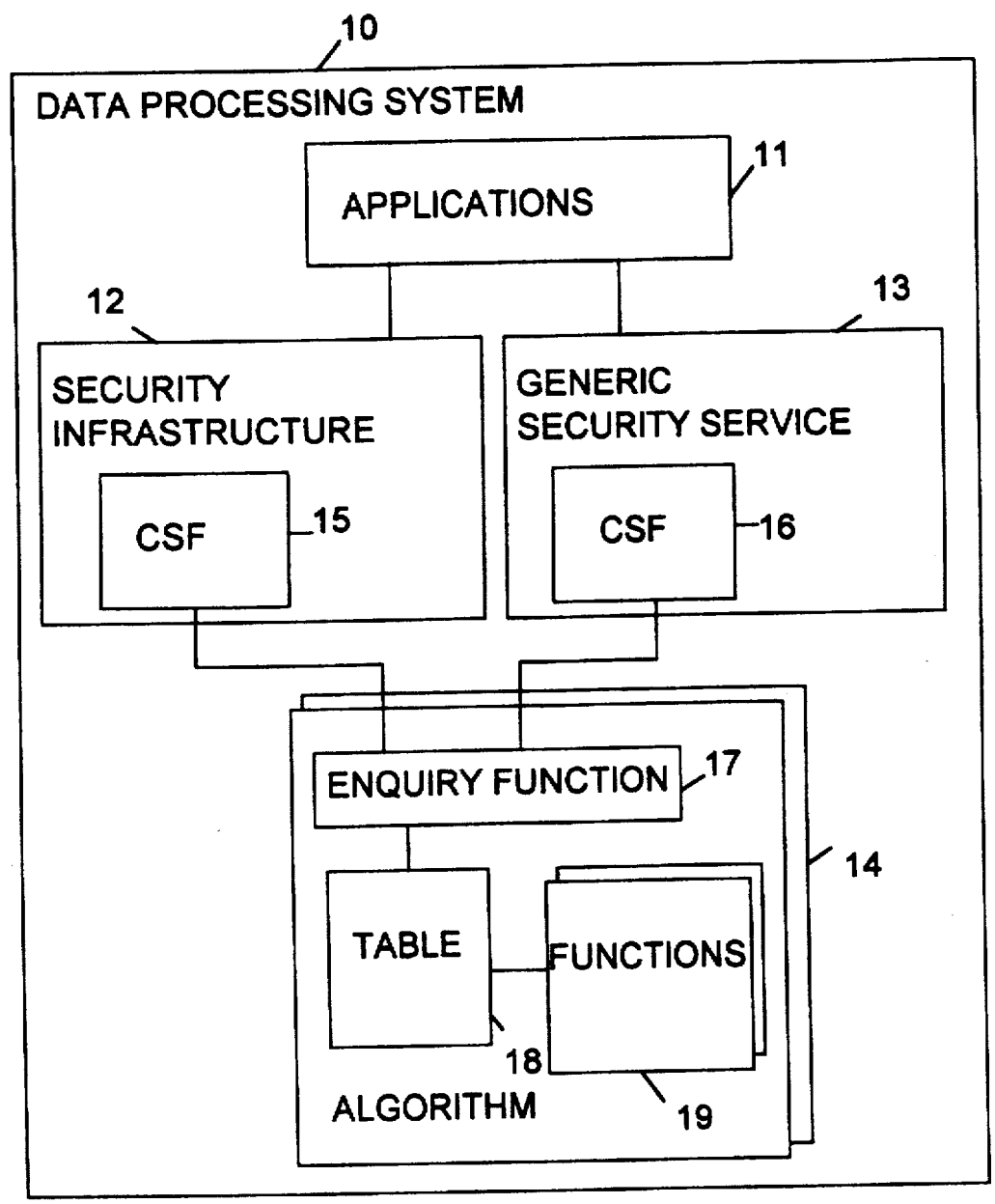
FIG. 1 is a block diagram of a data processing system comprising a challenge/response mechanism for authenticating access to sensitive functions.

Referring to FIG. 1, a data processing system 10 comprises a number of user applications 11, a security infrastructure 12, a generic security service 13 for user data, and a number of cryptographic algorithms 14. Some of the algorithms are strong algorithms for use by the security infrastructure while others are weak algorithms for protecting user data.

In order to ensure that the security infrastructure 12 alone has strong cryptographic algorithms made available to it and that the user data is protected only by the weaker algorithms as required by the national bodies, it is necessary to provide separate controls over the cryptographic services required by the security infrastructure 12 and the cryptographic services available for protecting user data. The separate controls are achieved by providing a first Cryptographic Support Facility (CSF) 15 for the security infrastructure and a second separate CSF 16 for the user data.

Normally during application development source code modules are compiled into object code modules and collections of object code modules may be grouped into libraries. An application is built by linking object code modules and libraries to form an executable image. Conventionally libraries are implemented as a Static Link Library (SLL). SLLs cannot be replaced without requiring the application to be re-linked. Dynamic Link Libraries (DLLs) allow some of the symbolic links within an executable image to be left unresolved until the application is run or the function which resolves the DLL is invoked. This is known as late binding and allows a DLL to be replaced without the need of any additional linking. All that is necessary is for the application to be restarted and when it is run, or when the function which resolves the DLL is invoked, the symbolic links will be resolved automatically.

The CSF 15 for the security infrastructure is set up as an SLL. This ensures user applications cannot link with it to gain access to the stronger algorithms available to the CSF 15. On the other hand, the CSF 16 for the generic security service is set up as a DLL.

Each algorithm 14 has an enquiry function 17 and a function table 18 containing pointers to the various functions (operations) 19 of the algorithm. The enquiry function provides a predetermined interface with the CSFs. Algorithms that support this agreed interface are referred to as supported algorithms.

The algorithms 14 are contained in a number of DLLs. Because DLLs are employed, the cryptographic algorithms can be replaced easily. However, assuming the CSF 15 for the security infrastructure 12 and the CSF 16 for the generic security interface have the same interface, the use of DLLs to allow replacement of the cryptographic algorithms is open to abuse because a user can simply replace the weak algorithms intended for protection of the user data with the strong algorithms intended for use by the security infrastructure.

The Challenge/Response Mechanism

Figure 2:
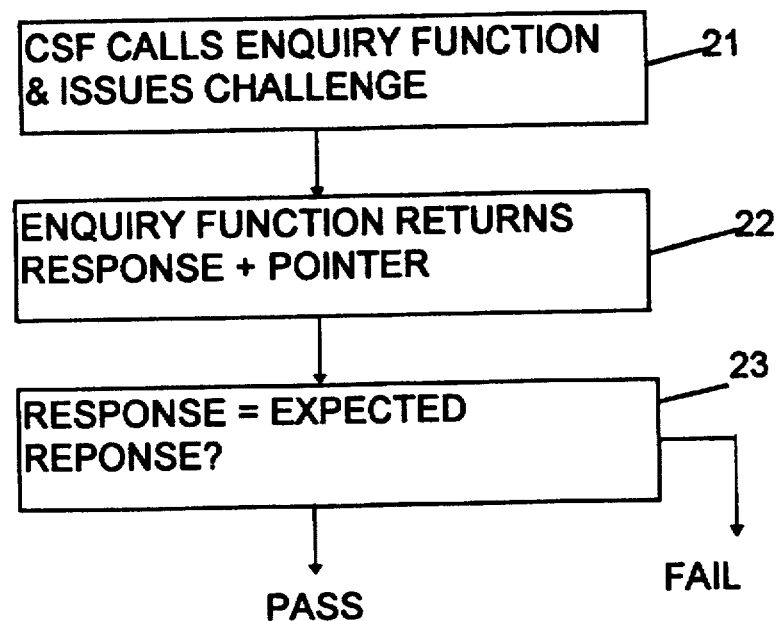
FIG. 2 is a flow chart which illustrates the steps involved in the challenge/response mechanism.

To protect against this possible abuse, a challenge/response mechanism is provided which enables a CSF to verify the authenticity of any algorithm used by it. The operation of this challenge/response mechanism will now be described with reference to FIG. 2.

(Box 21) Whenever the CSF requires to use one of the algorithms, it calls the algorithm's enquiry function. The call includes a challenge, comprising a random number.

(Box 22) When the algorithm's enquiry function 17 receives this call, it generates a response to the challenge, by encrypting the challenge, using a secret key, known also to the CSF. Algorithms intended to be used with the security infrastructure use a first secret key to generate the response, while algorithms intended only for protecting user data use a second secret key to generate the response. The enquiry function returns the response to the CSF along with a pointer to the function table 18. The pointer is encrypted under the shared secret key, in order to prevent an "attacker in the middle" relaying the requests and responses between the CSF and the algorithm in order to gain access to the function table.

(Box 23) When the CSF receives the response, it generates an expected response value, by encrypting the original challenge, using the shared secret key. The CSF then compares the actual response from the enquiry function with this expected response. If the actual response is equal to the expected response, the CSF accepts the algorithm as a supported algorithm, and decrypts the encrypted function table pointer. The CSF then goes ahead with using the algorithm. If on the other hand the expected response is not equal to the actual response, the CSF does not use the algorithm.

Thus, it can be seen that the challenge/response mechanism enables the CSF to verify that the authenticity of the algorithm: that is, to verify that the algorithm is indeed a supported algorithm, and that algorithm in one category has not been replaced by an algorithm in the other category. If this verification fails, the CSF will refuse to use the algorithm.

Some Possible Modifications

In a possible modification of the challenge/response mechanism described above, when the CSF receives the response, it decrypts the response, using the shared secret key, and then compares the decrypted value with the original challenge.

In another possible modification of the challenge/response mechanism, when the enquiry function receives a challenge, it uses the challenge as a seed for a pseudo-random number generator (RNG), comprising a shift register with secret feedback tappings. The RNG is then clocked a predetermined number of times, and each time the RNG is clocked, one bit is shifted out. The output bits are accumulated to produce a pseudo-random number. This pseudo-random number is then encrypted using the shared secret key, and the encrypted value is returned to the CSF as the response. When the CSF receives this response, it generates the expected value of the pseudo-random number, by applying the challenge to an RNG with the same tappings as the RNG used by the enquiry function. The CSF then either:

(a) encrypts the expected pseudo-random number and compares the result with the response, or (b) decrypts the response and compares it with the expected pseudo-random number.

Mutual Authentication

It may be desirable for an algorithm to challenge the CSF which invokes its enquiry function, to ensure that only a legitimate CSF can use the algorithm and not any application attempting to use the algorithm directly. This can be achieved by a procedure referred to as mutual authentication.

Figure 3:
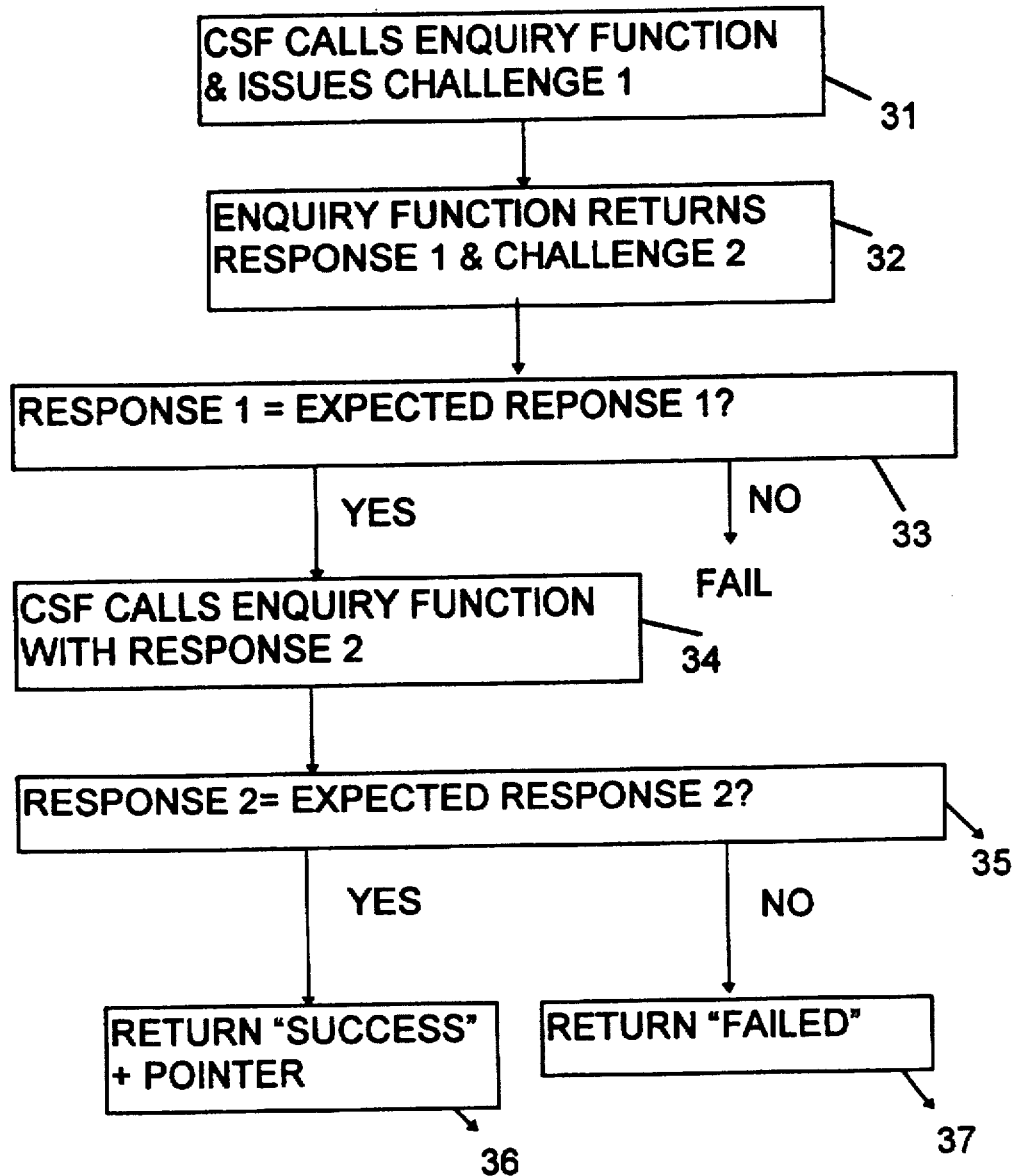
FIG. 3 is a flowchart which illustrates the steps involved in a mutual authentication mechanism.

Referring to FIG. 3, the mutual authentication procedure is as follows.

(Box 31) Whenever the CSF requires to use one of the algorithms, it calls that algorithm's enquiry function. The call includes a challenge, referred to as challenge 1.

(Box 32) When the algorithm receives this call, the algorithm uses its enquiry function to generate a response (response 1) to challenge 1, the response being a predetermined cryptographic function of the challenge. At the same time, the enquiry function generates its own challenge, referred to as challenge 2. The enquiry function returns response 1 and challenge 2 to the CSF.

(Box 33) When the CSF receives response 1, it compares the actual response from the algorithm with the expected response. If the actual response is not equal to this expected response, a failure is indicated.

(Box 34) If the actual response is equal to the expected response, the CSF generates a response (response 2) to challenge 2. The CSF then calls the enquiry function again, the call including response 2.

(Box 35) When the enquiry function receives response 2, it compares it with the expected response.

(Box 36) If the actual response 2 is equal to this expected response, the enquiry function returns a "success" message to the CSF, along with a pointer to the function table, encrypted under a shared secret key.

(Box 37) If on the other hand the actual response 2 is not equal to the expected response, a "failed" message is returned to the CSF.

I claim:

1. A data processing system comprising:
   (a) a cryptographic support facility; and
   (b) a cryptographic algorithm module, for use by said cryptographic support facility, said cryptographic algorithm module comprising an enquiry function, a plurality of cryptographic functions, and a function table containing pointers to said cryptographic functions;
   (c) said cryptographic support facility comprising means for issuing a challenge to said enquiry function of said cryptographic algorithm module;
   (d) said enquiry function of said cryptographic algorithm module comprising means for generating a response to said challenge and for returning said response to said cryptographic support facility along with an encrypted pointer to said function table; and
   (e) said cryptographic support facility comprising means for checking said response, and for decrypting said encrypted pointer and thereby enabling use of said cryptographic algorithm module by said cryptographic support facility only when said response is equal to an expected response value.

2. A system according to claim 1 wherein said cryptographic support facility is provided by a static link library (SLL).

3. A system according to claim 1 wherein said cryptographic support facility further includes means for generating a further response, and for returning said further response to said cryptographic algorithm module, and wherein said cryptographic algorithm module comprises means for checking said further response, and for permitting use of said cryptographic algorithm module by said cryptographic support facility only when said further response is equal to an expected further response.

4. A system according to claim 1 wherein said means for generating a response comprises means for applying a cryptographic function to said challenge.

5. In a data processing system comprising a cryptographic support facility and a cryptographic algorithm module for use by said cryptographic support facility, said cryptographic algorithm module comprising an enquiry function, a plurality of cryptographic functions, and a function table containing pointers to said cryptographic functions, a method for enabling said cryptographic support facility to verify authenticity of said cryptographic algorithm module, said method comprising the steps:

(a) causing said cryptographic support facility to send a challenge to said enquiry function of said cryptographic algorithm module;

(b) causing said enquiry function of said cryptographic algorithm module to generate a response by applying a cryptographic function to the challenge, and to return said response to said cryptographic support facility along with an encrypted pointer to said function table;

(c) causing said cryptographic support facility to check said response; and (d) decrypting said encrypted pointer and thereby enabling use of said cryptographic algorithm module by said cryptographic support facility only when said response is equal to an expected response value.

* * * * *